April 7, 1931.  S. I. FEKETE  1,799,360
MANIFOLD CLAMP
Filed July 28, 1923
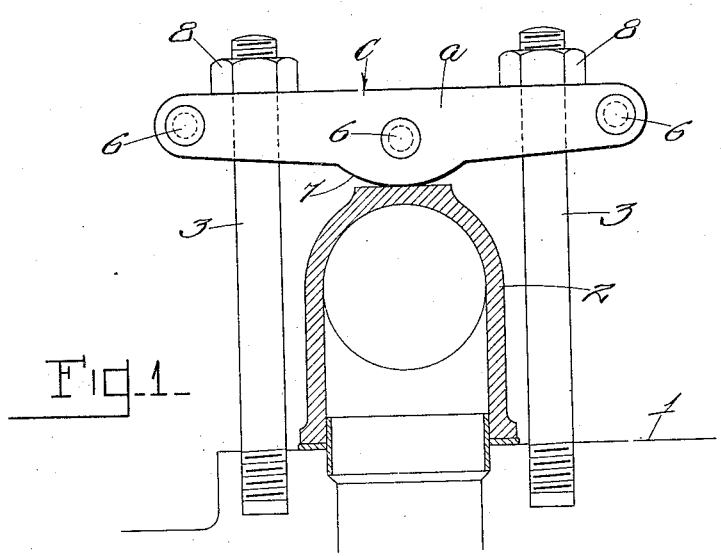
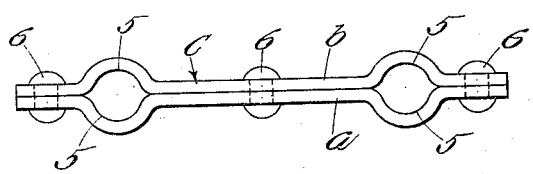

Patented Apr. 7, 1931

1,799,360

UNITED STATES PATENT OFFICE

STEPHEN I. FEKETE, OF DETROIT, MICHIGAN, ASSIGNOR TO HUDSON MOTOR CAR COMPANY, OF DETROIT, MICHIGAN, A CORPORATION OF MICHIGAN

MANIFOLD CLAMP

Application filed July 28, 1923. Serial No. 654,323.

This invention relates to a new and useful improvement in manifold clamps. The object of the invention is to provide a clamp which may be made very cheaply and is very light, yet is strong and durable, and may be easily put in its place. The invention consists in making the clamp of two pieces stamped out of sheet metal secured together, the two members being companion pieces so shaped that when they are united there is formed between them bearings or guide-holes for the studs on which they are mounted.

The invention will be fully understood from the following description when taken in connection with the accompanying drawings, and the novel features thereof will be pointed out and clearly defined in the claims at the close of this specification.

In the drawings, Fig. 1 is a vertical section, showing a manifold clamped to a cylinder block by a clamp embodying the invention.

Fig. 2 is a plan view of the clamp detached.

Referring now to the drawings, there is represented at 1 the top portion of a cylinder block having mounted thereon a manifold 2. The manifold is clamped to the block and held firmly in place by a series of clamps C embodying the invention, only one of which is shown in the drawings. Each clamp C is mounted for engagement with the top of the manifold on studs 3—3 which extend upwardly from the top of the block, and is held in place against the manifold by nuts 8—8 in threaded engagement with the studs.

The clamp C is composed of two members $a, b$. Each member is stamped out of a single sheet of metal in such manner as to form two semi-cylindrical grooves or depressions 5, 5 and is formed with holes for the rivets 6, which unite them together. These rivet holes may be made by the stamp at the same operation as the grooves 5, 5. There is preferably one rivet hole near each end and one in the middle. The two end rivet holes are preferably equidistant from the proximate ends of the clamp, as are also the grooves 5, 5, and the two members $a, b$ are preferably made substantially similar although oppositely disposed. They are interchangeable do not have to be made in pairs.

The lower edge of each member is formed with a downwardly extending arc-shaped projection 7 which forms a rocker shaped edge bearing portion of the clamp for engagement with the top of the manifold.

The two members $a, b$ are positioned with the concave faces of the grooves 5, 5 facing each other and are secured together by the rivets 6 passing through the rivet holes. They can also be spot welded together if preferred. The oppositely disposed grooves 5, 5 thus together form guide holes or bearings for the studs 3, 3 at opposite sides of the edge bearing portion. The clamp is readily mounted on the studs 3, 3 and secured by the clamp nuts 8 screwed down upon the threaded upper ends of the studs to exert an edgewise clamping force on the members $a, b$.

By making the clamp as above described the edgewise rigidity of the sheet metal is utilized in such a manner that considerable expense and weight is saved over forgings, which are relatively expensive and require drilling, but without the loss of any necessary strength.

What I claim is:

1. A manifold clamp comprising two sheet metal members secured together face to face and having arc-shaped edge projections forming a bearing portion to engage the manifold, and devices at opposite sides of said bearing portion for exerting and edgewise clamping force on said members.

2. A manifold clamp comprising two sheets of metal secured together and having an edgewise bearing portion to engage the manifold, and devices at opposite sides of said bearing portion for exerting an edgewise clamping force, the engaging portions of said clamp and manifold providing a line contact perpendicular to a line between said devices with the adjacent portions of said clamp and manifold receding relatively to permit rocking of said clamp relative to said manifold.

In testimony whereof I affix my signature.

STEPHEN I. FEKETE.